(12) United States Patent
Mohammad et al.

(10) Patent No.: US 11,781,725 B2
(45) Date of Patent: Oct. 10, 2023

(54) METHOD AND APPARATUS FOR GENERATING THREE-DIMENSIONAL OCCULTATION IMAGING FROM SLIM PROFILE LIGHTING ASSEMBLY

(71) Applicant: Magna Exteriors Inc., Aurora (CA)

(72) Inventors: Rafat Mohmoud Mohammad, Dearborn, MI (US); Frank Hallitschke, Backnang (DE); Helgert Elezi, Saint Clair Shores, MI (US); Jacob Williams, Ypsilanti, MI (US)

(73) Assignee: MAGNA EXTERIORS INC., Aurora (CA)

( * ) Notice: Subject to any disclaimer, the term of this patent is extended or adjusted under 35 U.S.C. 154(b) by 0 days.

(21) Appl. No.: 17/966,386

(22) Filed: Oct. 14, 2022

(65) Prior Publication Data

US 2023/0124798 A1 Apr. 20, 2023

Related U.S. Application Data

(60) Provisional application No. 63/256,823, filed on Oct. 18, 2021.

(51) Int. Cl.
*F21S 43/14* (2018.01)
*F21S 43/31* (2018.01)
*B60Q 1/00* (2006.01)

(52) U.S. Cl.
CPC .............. *F21S 43/14* (2018.01); *F21S 43/31* (2018.01); *B60Q 1/0023* (2013.01)

(58) Field of Classification Search
CPC ........... F21S 43/30; F21S 43/255; F21S 43/26
See application file for complete search history.

(56) References Cited

U.S. PATENT DOCUMENTS

| | | | |
|---|---|---|---|
| 7,726,854 B2 | 6/2010 | Bourdin et al. | |
| 9,458,979 B2* | 10/2016 | Song | F21S 43/14 |
| 2009/0003002 A1* | 1/2009 | Sato | G02B 6/0061 362/341 |
| 2009/0154184 A1* | 6/2009 | King | F21V 13/04 362/232 |
| 2012/0268940 A1* | 10/2012 | Sahlin | G02B 5/045 362/342 |
| 2013/0265791 A1* | 10/2013 | Dassanayake | B60Q 1/304 362/520 |
| 2013/0329445 A1* | 12/2013 | Oh | F21S 43/19 362/543 |
| 2016/0369964 A1* | 12/2016 | Marchesin | B26D 7/10 |
| 2018/0163942 A1* | 6/2018 | Salter | H05B 47/105 |
| 2019/0162382 A1* | 5/2019 | Kang | F21S 43/31 |

* cited by examiner

*Primary Examiner* — Eric T Eide
(74) *Attorney, Agent, or Firm* — DICKINSON WRIGHT PLLC

(57) ABSTRACT

A lighting assembly and method generate a three-dimensional lighting effect with parallax, depth and brightness variability or twinkling among different viewing angles using an LED substrate and different optic component layers including one or more obscuration patterns and a reflection chamber for unobscured light from LEDs components not obscured by the one or more obscuration patterns. The LED substrate can employ mini or micro scale package LEDs or their unpackaged LED dies for slim profile lighting assembly. The LED substrate and different optic component layers can be curved, employ direct illumination and occultation imaging.

19 Claims, 7 Drawing Sheets

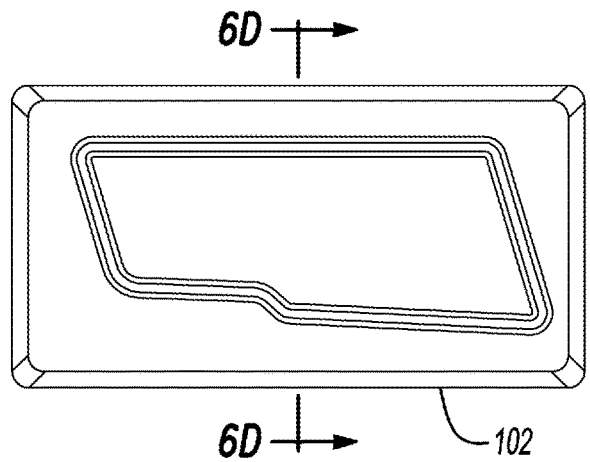
_Fig-6A_
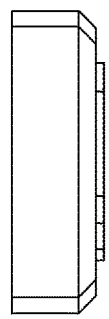
_Fig-6C_
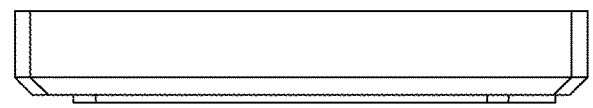
_Fig-6B_
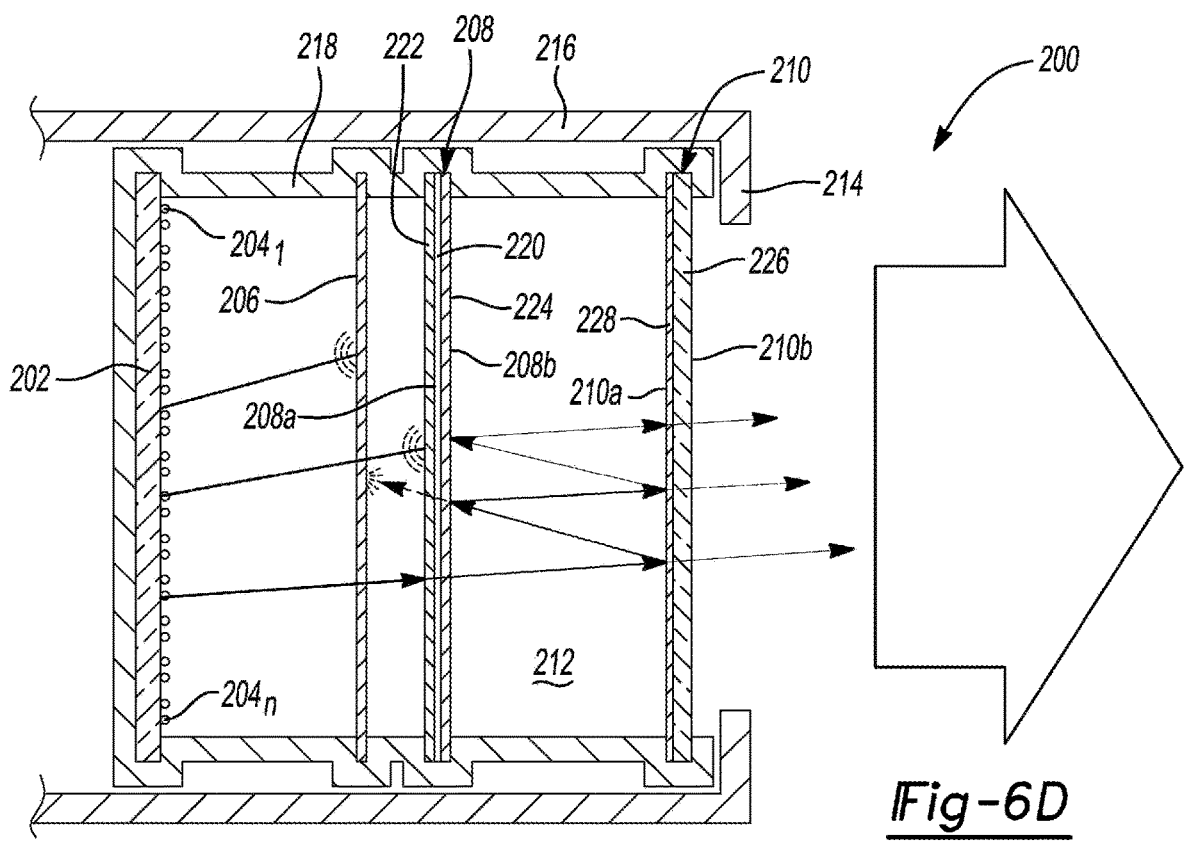
_Fig-6D_

METHOD AND APPARATUS FOR GENERATING THREE-DIMENSIONAL OCCULTATION IMAGING FROM SLIM PROFILE LIGHTING ASSEMBLY

CROSS-REFERENCE TO RELATED APPLICATIONS

This utility application claims the benefit of U.S. Provisional Application No. 63/256,823 filed Oct. 18, 2021. The entire disclosure of the above application is incorporated herein by reference.

FIELD

The present disclosure relates to generally to a slim profile light emitting diode (LED)-based lighting assembly and method of providing three-dimensional lighting effect with parallax, depth, and brightness variability or twinkling among different viewing angles. The present disclosure further relates generally to the lighting assembly being controlled to provide one or more vehicle light operations with superior appearance and design versatility.

BACKGROUND

This section provides background information related to the present disclosure which is not necessarily prior art.

It is known to employ semiconductor light sources, in particular light emitting diodes (LEDs), in automotive signal lights. For example, tail lights on some vehicles include an array of red light-emitting and/or amber light-emitting LEDs which are positioned between a reflector and a lens to provide the desired signal patterns. It is also known to have signal lamps wherein one or more LEDs are arranged in a direct view wherein the output of the LED passes directly through the lens of the signal light.

While known signal lights employing LEDs provide advantages over signal lights employing incandescent bulbs, they still suffer from some problems. For example, available LEDs emit limited amounts of light relative to incandescent lamps. Due to these lower emitted levels of light and/or the inefficiency of a conventional reflector and lens in transmitting the light produced by the LEDs, a large number of LEDs must often be employed to produce sufficient signal lighting to meet regulatory requirements. Further, this large number of LEDs must be appropriately spaced about the signal light to provide the lighted surface area required to meet regulatory requirements and thus the aesthetic design of such signal lights is limited.

As will be apparent, next to regulatory and safety concerns, aesthetic design can be one of the most significant considerations for the designer of a vehicle and, to date, the range of aesthetic design available for automotive lighting features using semiconductor light sources has been limited.

SUMMARY

This section provides a general summary of the disclosure and is not a comprehensive disclosure of its full scope or all of its features, aspects and objectives.

A lighting assembly for generating occultation imaging is provided. The lighting assembly comprises an illuminator substrate with a plurality of light emitting diodes (LEDs) disposed thereupon and distributed across the illuminator substrate to emit light therefrom. The lighting assembly also comprises at least one mask defining an obscuration pattern and configured to obscure some of the light emitted from the plurality of LEDs and to produce unobscured light corresponding to the obscuration pattern. The lighting assembly also comprises a reflection chamber having an input surface that receives the unobscured light, at least one reflective layer defining an interior chamber and configured to generate multiple reflections of the unobscured light, and an output surface that directs light from the multiple reflections to outside the reflection chamber.

In some embodiments, the plurality of LEDs include unpackaged LED dies.

In some embodiments, the unpackaged LED dies are each configured as mini LED dies having an area of between 100 µm and 350 µm.

In some embodiments, the unpackaged LED dies are each configured as micro LED dies having an area of between 2 µm and 100 µm.

In some embodiments, the at least one reflective layer of the reflection chamber comprises two partially-reflective layers facing toward one another.

In some embodiments, the two partially-reflective layers of the interior chamber extend parallel to one another.

In some embodiments, the two partially-reflective layers of the interior chamber each extend parallel to the illuminator substrate.

In some embodiments, the at least one reflective layer of the reflection chamber includes a metallic layer disposed on a reflector substrate.

In some embodiments, the at least one reflective layer of the reflection chamber is configured to reflect a portion of incident light thereupon and to transmit at least about 20% of the incident light therethrough.

In some embodiments, the obscuration pattern includes a random pattern.

In some embodiments, the at least one mask includes two masks spaced apart from one another.

In some embodiments, the at least one mask includes a mask layer disposed on the input surface of the reflection chamber.

In some embodiments, the at least one mask includes a mask layer disposed between and spaced apart from each of the illuminator substrate and the input surface of the reflection chamber.

In some embodiments, the reflection chamber comprises two partially-reflective layers. In some embodiments, the illuminator substrate is curved and the two partially-reflective layers are each curved with a curvature corresponding to the curvature of the illuminator substrate.

A method of generating occultation imaging from a lighting assembly is also provided. The method comprises: arranging an illuminator substrate extending across a width of the lighting assembly with a plurality of light emitting diodes (LEDs) disposed thereupon and distributed thereacross; emitting light from the plurality of LEDs on the illuminator substrate; obscuring the light emitted from the plurality of LEDs in accordance with at least one obscuration pattern and to produce an unobscured light; generating plural reflections of the unobscured light, the plural reflections being generated across at least part of the width of the lighting assembly; and outputting the plural reflections from the lighting assembly.

In some embodiments, generating the plural reflections of the unobscured light is performed by a reflection chamber having an input surface. In some embodiments, obscuring the light emitted from the plurality of LEDs includes arranging a first mask layer between and spaced apart from each of the illuminator substrate and the input surface of the reflection chamber.

In some embodiments, obscuring the light emitted from the plurality of LEDs further includes arranging a second mask layer between the first mask layer and the input surface of the reflection chamber.

In some embodiments, the method further comprises generating a twinkling effect using a random pattern for at least one of the first mask layer and the second mask layer.

In some embodiments, generating the plural reflections of the unobscured light is performed by a reflection chamber including two partially-reflective layers spaced apart from one another.

In some embodiments, the two partially-reflective layers of the reflection chamber extend parallel to one another and parallel to the illuminator substrate.

It will be appreciated that any of the aspects of this summary can be combined with other aspects in this summary as well as with the various embodiments described below.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5A:
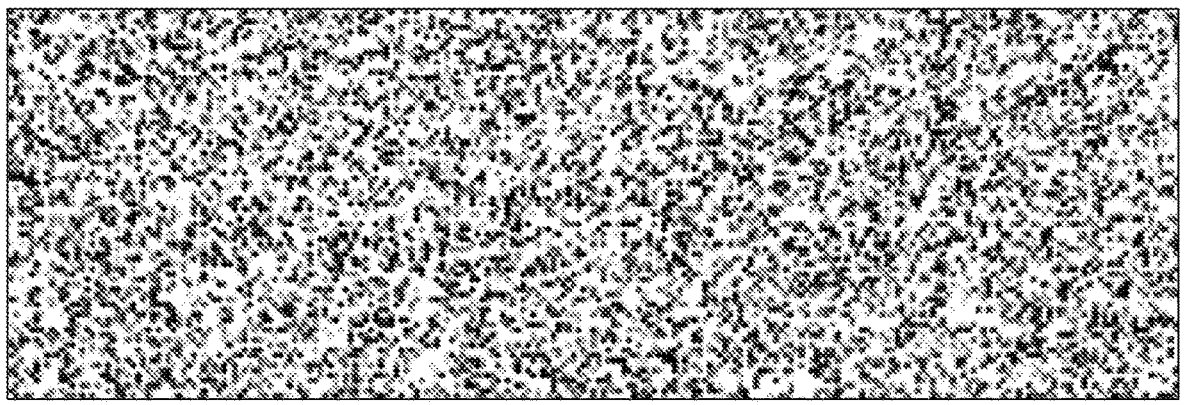
Figure 5B:
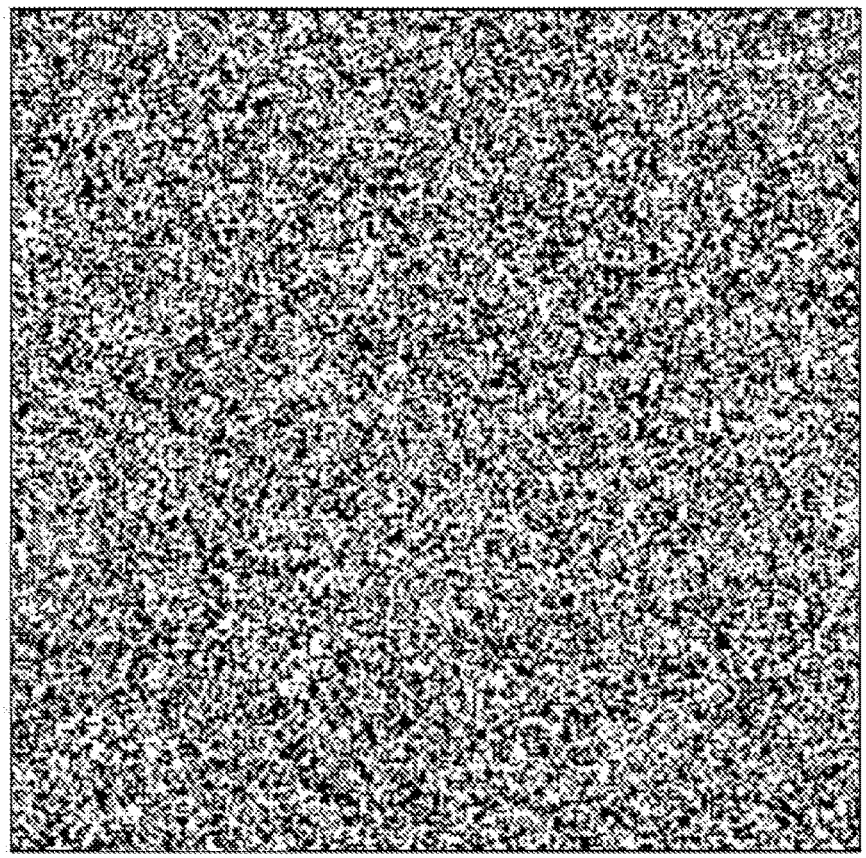
Figure 7A:
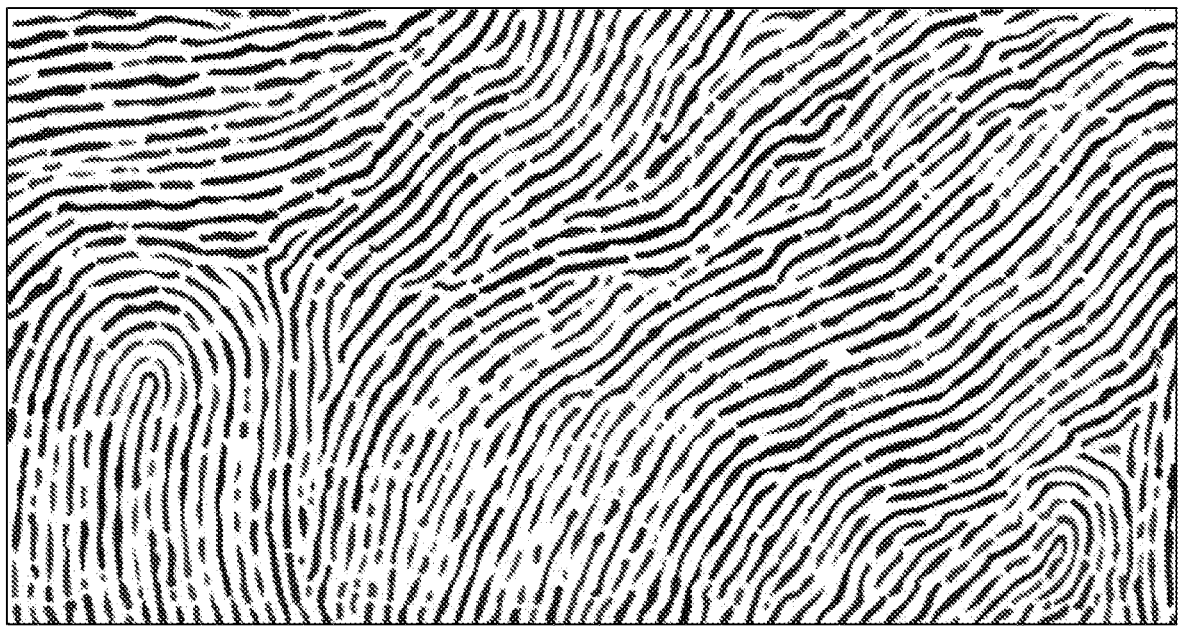
Figure 7B:
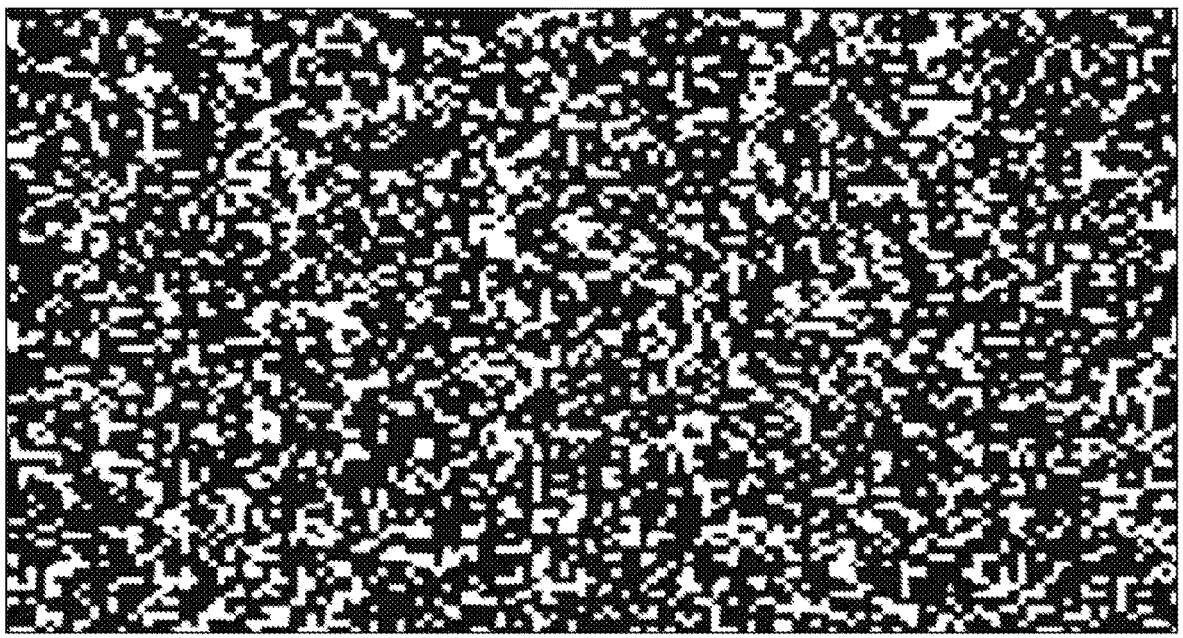
Figure 8:
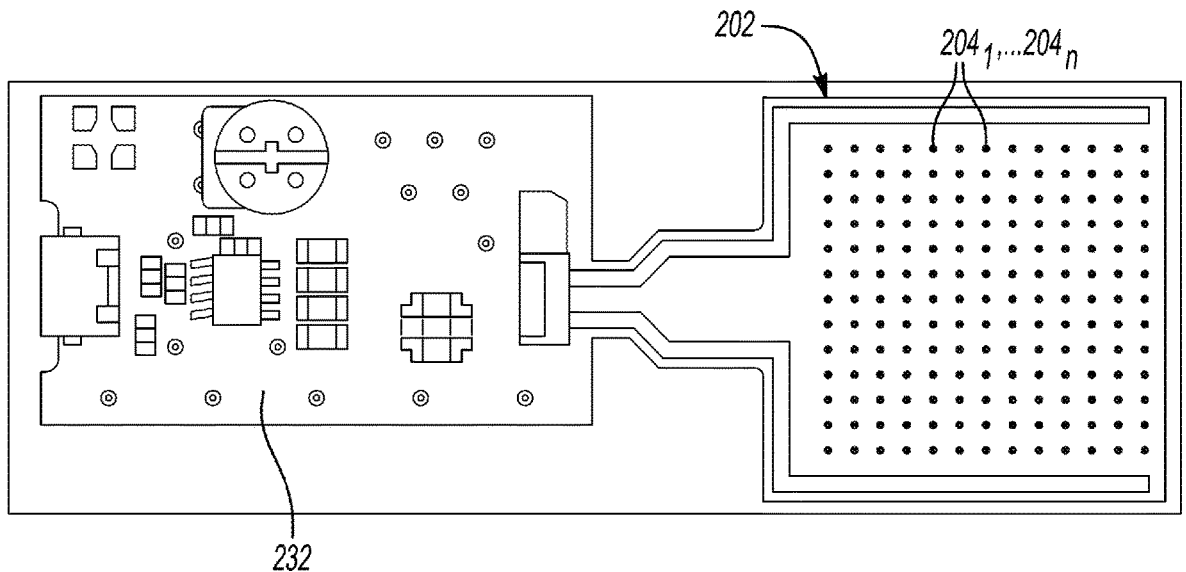
Figure 9:
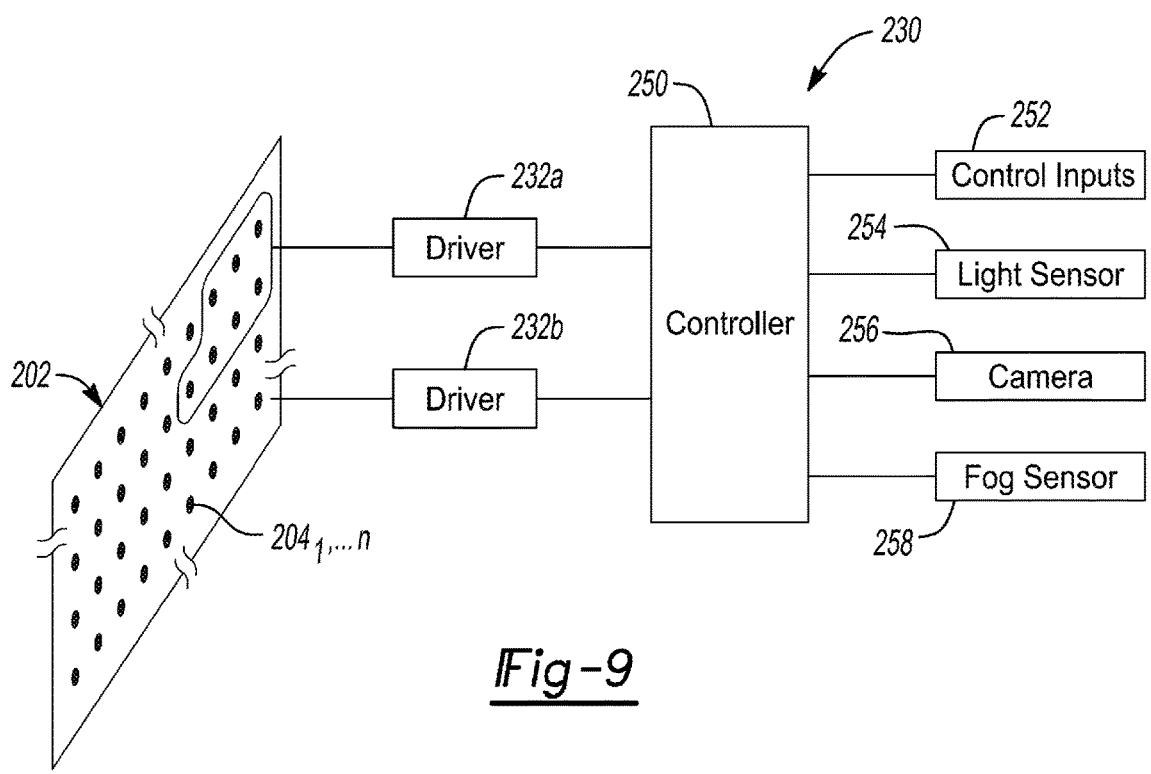
Figure 10:
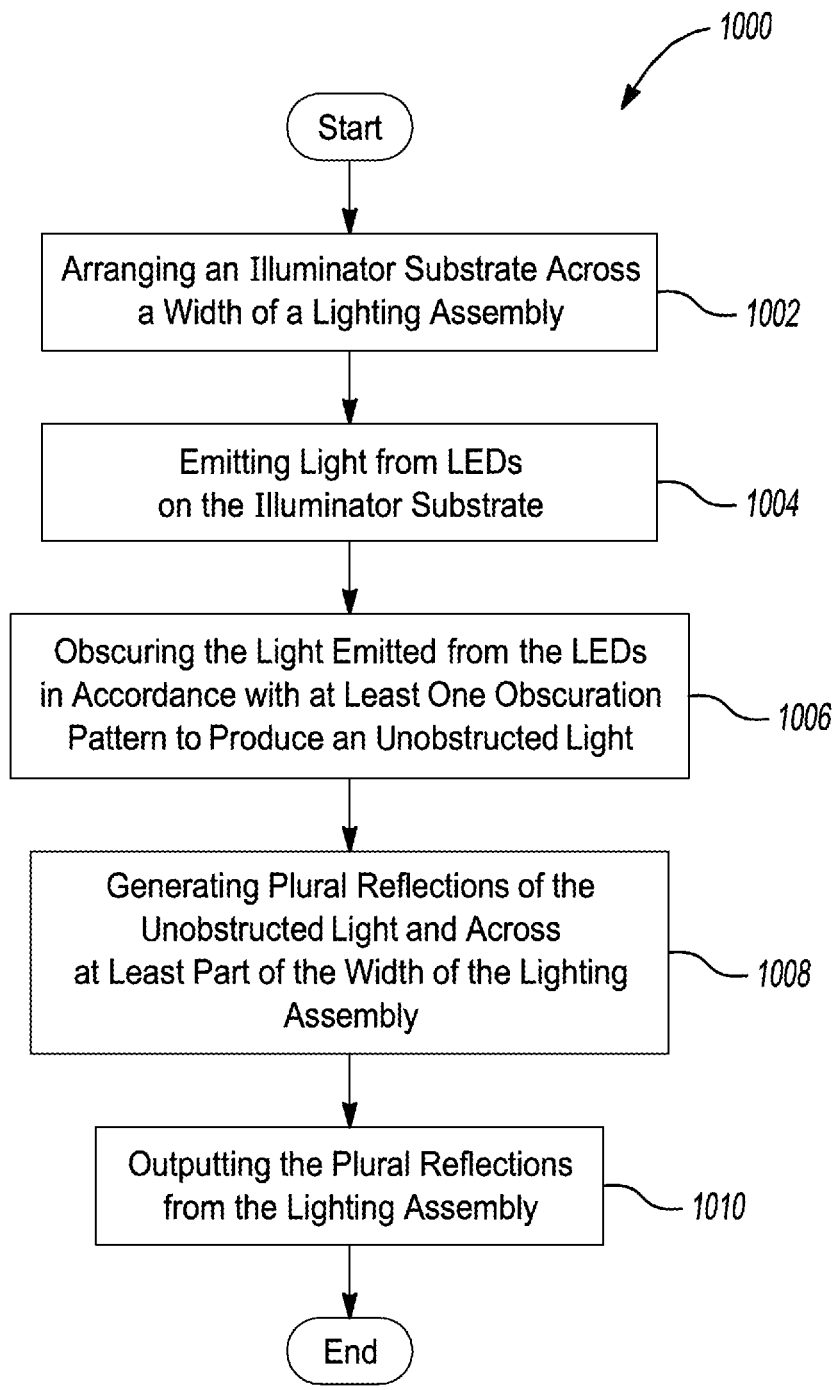

FIGS. 5A and 5B each depict an example obscuration pattern employed by a lighting assembly constructed in accordance with example embodiments;

FIGS. 6A, 6B and 6C show, respectively, front, top and left side view of another example vehicle lighting module comprising a lighting assembly constructed in accordance with example embodiments;

FIG. 6D shows a side view of the vehicle lighting module in FIGS. 6A, 6B and 6C with a schematic of optic components employed in a lighting assembly constructed in accordance with example embodiments;

FIGS. 7A and 7B each depict an example obscuration pattern employed by a lighting assembly constructed in accordance with example embodiments;

FIG. 8 depicts an example arrangement of light generators such as unpackaged light emitting diodes (LEDs) or LED dies in a multi-function lighting assembly constructed in accordance with example embodiments;

FIG. 9 shows a block diagram of an example control system for a lighting assembly in accordance with example embodiments; and FIG. 10 shows a flow chart depicting operations in an example method of generating a three-dimensional lighting effect with parallax, depth and brightness variability or twinkling among different viewing angles.

DETAILED DESCRIPTION

Example embodiments will now be described more fully with reference to the accompanying drawings, wherein corresponding reference numerals indicate corresponding parts throughout the several views of the drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In accordance with example embodiments of the present disclosure, an advantageous lighting assembly 200 and method are provided to generate a three-dimensional lighting effect with parallax, depth and brightness variability or twinkling among different viewing angles. The lighting assembly 200 and method can be used, for example, to achieve high-performance, high-efficiency vehicle lighting with greater styling freedom (i.e., in terms of cost, aesthetics and versatility) than conventional vehicle lighting technologies.

Further, the lighting assembly 200 and method in accordance with example embodiments of the present disclosure use lighting technology wherein thin-film mini LED dies or micro LED dies are applied to a surface with microscopic accuracy. A variety of different surfaces can be used, including a flexible or rigid surface or substrate. The lighting assembly 200 and method described herein in accordance with example embodiments therefore can achieve more distinctive and stylized vehicle lighting, and a broader range of applications, than conventional vehicle lighting technology. It is to be understood, however, that the lighting assembly 200 and method in accordance with example embodiments of the present disclosure can also be implemented using standard packaged LEDs.

Figure 1:
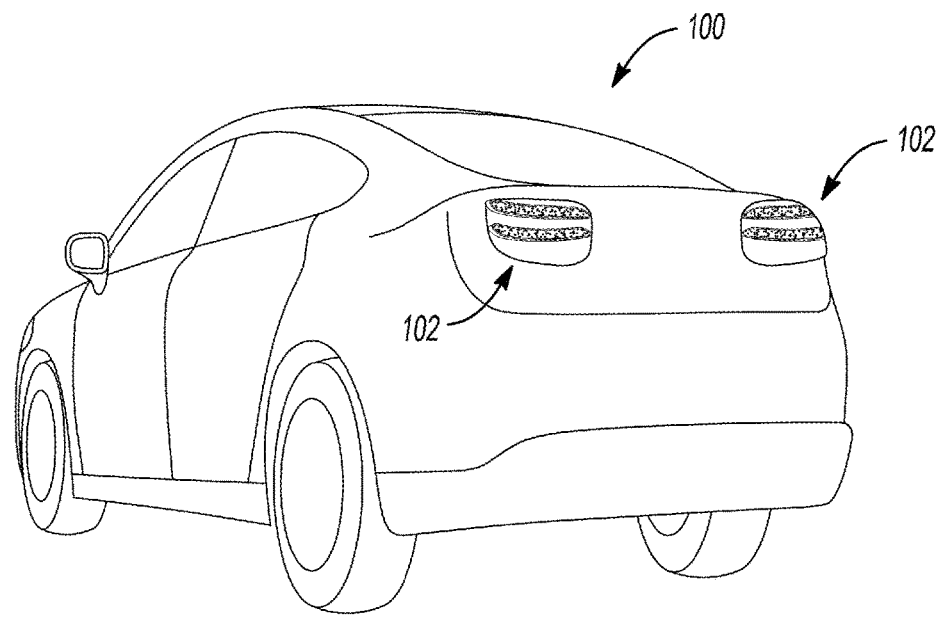
FIG. 1 shows perspective view of a vehicle with a vehicle lighting module comprising a lighting assembly constructed in accordance with example embodiments.
Figure 2:
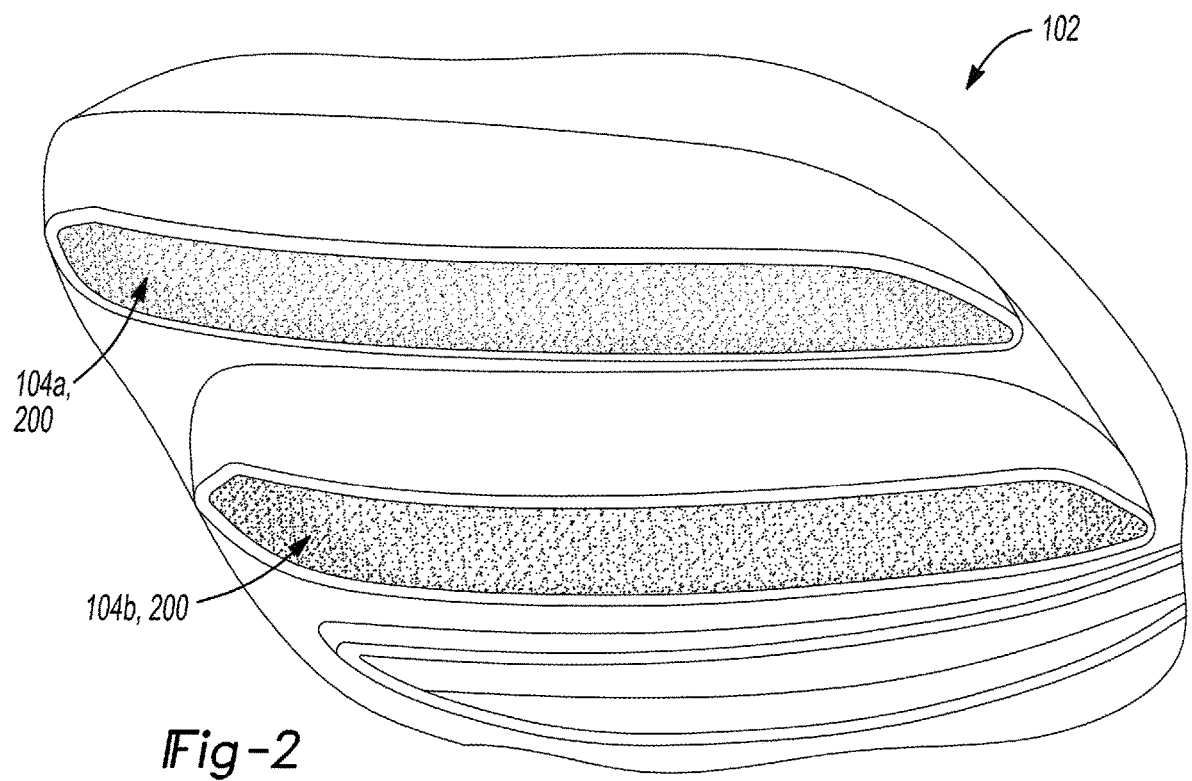
FIG. 2 depicts example light patterns generated from a lighting assembly constructed in accordance with example embodiments.

With reference to FIGS. 1 and 2, a vehicle 100 is shown with a rear vehicle lighting module 102. One or more of the lighting assembly 200 can be provided in the vehicle lighting module 102 to generate desired lighting patterns for different vehicle lighting operations such as, but not limited to, tail lights, turn signal indicators, brake lights and fog lights. For example, as shown in FIG. 2, one or more of the lighting assembly 200 can be controlled to drive respective ones of LED dies in accordance with a first lighting area 104a, and to drive other respective ones of LED dies in accordance with a second lighting area 104b (e.g. two lighted areas 104a,b of a tail light or other vehicle lighting feature (e.g., brake light, turn signal indicator, fog light, and so on.

FIGS. 1-2 illustratively show the lighting assembly 200 in a rear vehicle lighting module 102 located on a rear surface of a vehicle. However, the lighting assembly 200 of the present disclosure may be used in other applications, such as, but not limited to, daytime running lights, headlights, turn signal indicators, fog light, and so on. The vehicle 100 may include one or more of the lighting assembly 200 of the present disclosure. The lighting assembly 200 may extend along a vehicle body surface, such as along a lift gate surface, a bumper surface or other vehicle body surface.

The lighting assembly 200 of the present disclosure may include a flexible illumination substrate, which may allow the lighting assembly 200 to be curved to conform to the shape and contours of the vehicle 100. As described, other optic components of the lighting assemblies 200 that direct and otherwise manipulate light emitted from the LEDs or LED dies can be curved. In the illustrated example of FIGS. 1 and 2, the curvature of the LED substrate and the layers of related optic components described below in connection with FIGS. 3, 4, 5A and 5B may provide a desirable lensing effect and facilitates directing light rearward from the light assembly 200 and therefore the vehicle light module 102 in which the light assembly 200 is deployed. Curvature of these components, however, is not required, as shown in FIGS. 6A through 6D, and 7A and 7B, to achieve desirable lighting effects (e.g., parallax, depth, and brightness variability or twinkling among different viewing angles) in accordance with example embodiments of the present disclosure.

Figure 3:
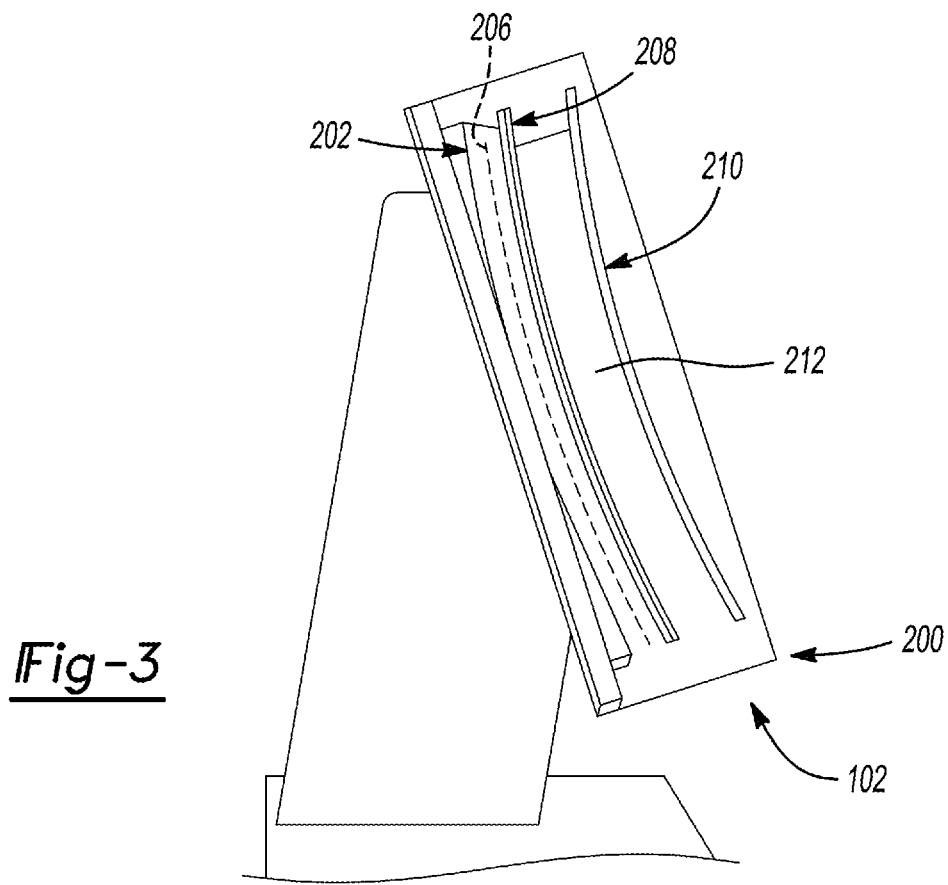
FIG. 3 shows a cross-section view of an example vehicle lighting module comprising a lighting assembly constructed in accordance with example embodiments.
Figure 4:
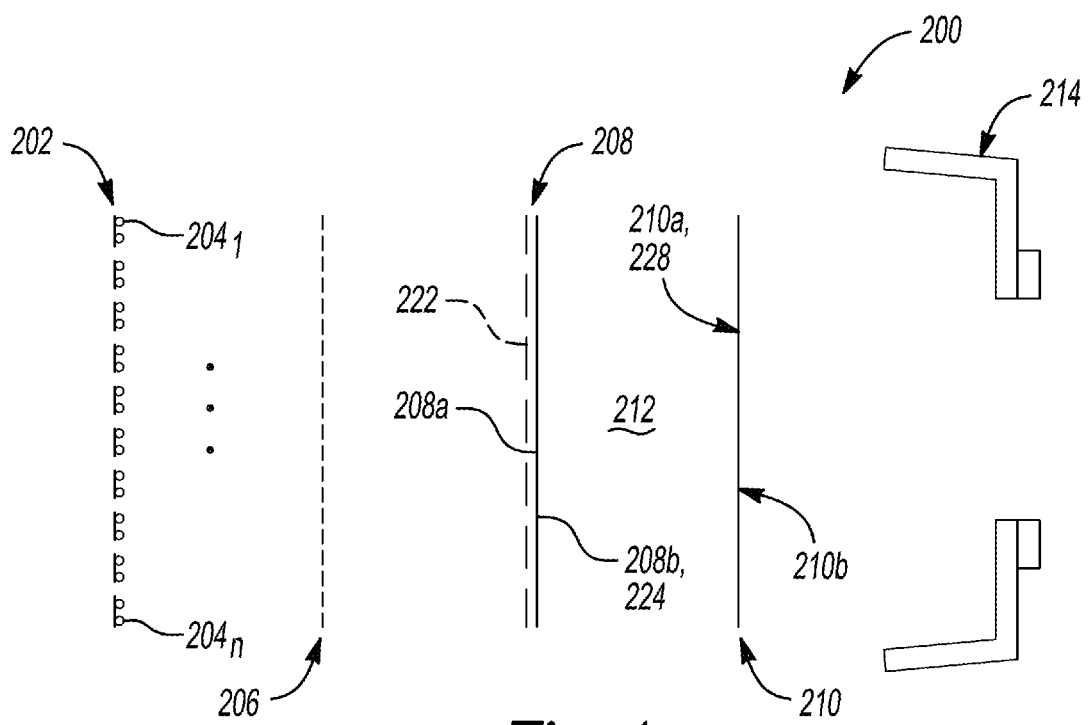
FIG. 4 shows a side view of a schematic of optic components employed in a lighting assembly constructed in accordance with example embodiments.

With reference to FIGS. 3 and 4 and in accordance with example embodiments, the lighting assembly 200 comprises an illuminator substrate 202 on which a plurality of LEDs $204_1 \ldots 204_n$ are disposed. The plurality of LEDs $204_1 \ldots 204_n$ are distributed across a surface of the illuminator substrate 202 to emit light therefrom. As explained further below in connection with FIG. 8, the plurality of LEDs $204_1 \ldots 204_n$ can include mini LED dies or micro LED dies. The plurality of LEDs $204_1 \ldots 204_n$ may be spaced densely such that alternate ones of the LEDs $204_1 \ldots 204_n$ can be switched off while other interspersed ones of the LEDs $204_1 \ldots 204_n$ are illuminated, and without causing any blackout regions corresponding to the switched-off ones of the LEDs $204_1 \ldots 204_n$ to be visible. It is to be understood, however, that the LEDs $204_1 \ldots 204_n$ of the lighting assembly 200 and operated accordance with the method described herein are not necessarily switched alternately with respect to each other. Nonetheless, the lighting assembly 200 with the plurality of LEDs $204_1 \ldots 204_n$ may provide a uniform appearance, which is one of the reasons why the lighting assembly 200 of the present disclosure is advantageous for achieving distinctive and stylized vehicle lighting with uniformity for a broader range of vehicle lighting applications. A uniform lighting surface across the lighting module 102 can create an elegant uniform lighting appearance for exterior tail and brake functions, while also providing sleek dynamic motion for functions such as turn signal lighting.

In accordance with aspects of illustrative embodiments, the lighting assembly 200 of the present disclosure employs an array of the LEDs $204_1 \ldots 204_n$ disposed on the illuminator substrate 202 and which are controllable. The lighting assembly 200 also includes various optic components to provide a desirable lighting effect. The desirable lighting effect provided by the lighting assembly 200 may include a three-dimensional lighting effect with parallax, depth and brightness variability and/or twinkling among different viewing angles. This desirable lighting effect allows a person to perceive a twinkling effect among the LEDs $204_1 \ldots 204_n$ (e.g., like a sparkling diamond effect) as well as depth and light flow as the person walks, for example, past one side of the vehicle lighting module 102 and to the other side of the vehicle lighting module 102 (e.g., across the width of the vehicle lighting module 102 on the vehicle 100), thereby changing a person's viewing angles.

As described below, the various optics components employed by the lighting assembly 200 and the method of the present disclosure (e.g., FIG. 10) provide a crisp appearance from different visual perception angles and a random light distribution with three-dimensional depth using directly illuminated random pattern two-dimensional imaging and the occultation effect of imaging.

With reference to FIG. 8, an example of the illuminator substrate 202 for a lighting assembly 200 is shown with a plurality of the LEDs $204_1 \ldots 204_n$ in the form of mini LED dies or micro LED dies mounted thereon. An LED driver or controller 232 is electrically connected to the illuminator substrate 202 to provide power and/or control signals thereto for controlling the LEDs $204_1 \ldots 204_n$. The term "LED" herein generally indicates an unpackaged LED or LED die, but could also be a standard packaged LED. An "unpackaged" LED refers to an unenclosed LED without protective features. For example, an unpackaged LED can refer to an LED die that does not include a plastic or ceramic enclosure, pins/wires connected to die contacts (e.g., for interfacing/interconnecting with ultimate circuitry), and/or a sealing (e.g., to protect the die from the environment). In some embodiments, one or more of the unpackaged LEDs may be configured as mini LED dies, also known as "mini chips", each having an area of 100-350 μm. Alternatively or additionally, one or more of the unpackaged LEDs may be configured as micro LED dies, also known as "micro chips", each having an area of 2-100 μm.

In accordance with an advantageous aspect of example embodiments in the present disclosure, the lighting assembly 200 may include the LEDs $204_1 \ldots 204_n$ on one or more of the illuminator substrates 202 to achieve the desired light effect. For purposes of illustration, a non-limiting functional example is described with reference to FIGS. 1 and 2, wherein an example lighting assembly 200 provides a tail light function in an illustrative vehicle lighting module 102. It is to be understood that the lighting assembly 200 can be configured to provide other lighting functions or combinations of two or more lighting functions such as, but not limited to, brake light and tail light functions, that employ the desirable technical effect achieved by the example embodiments described herein.

As shown in FIG. 3, an example vehicle lighting module 102 is shown which comprises a housing enclosing a lighting assembly 200, and that can enclose conventional components for other lighting function(s) such as semiconductor lighting source(s), lens(es) and/or reflector(s), cooling fins and/or heat sink(s), bezels and/or other structural supports, protective cover, among other components. The lighting assembly 200 has layers of optic components comprising a two-dimensional illuminator substrate 202 or panel that is curved, at least one of the first mask 206 and/or the second mask 222, and one or more reflective layers 208, 210 defining an interior chamber 212. The one or more reflective layers 208, 210 may each be similarly curved like the illuminator substrate 202.

With reference to FIGS. 4, 5A and 5B, the LEDs $204_1 \ldots 204_n$ are disposed on a two-dimensional surface of the illumination substrate 202. The LEDs $204_1 \ldots 204_n$ may be distributed over an area of the illuminator substrate 202. The illuminator substrate 202 can be arranged within a vehicle lighting module 102 housing across its width for example to thereby extend across at least a portion of the width of the vehicle 100 tail gate or other front or back vehicle surface, for example, to provide a front vehicle light function (e.g., headlamp, daytime running light, and so on) or a rear vehicle lighting function (e.g., tail light, brake light, and so on). Such an arrangement of the illuminator substrate 202 and related optic component layers of the lighting assembly 200 within a vehicle lighting module 102 facilitates the desirable lighting effect as a viewer changes viewing angles with respect to the car.

As shown in FIG. 4, the lighting assembly 200 includes other optical component layers including a first mask 206, a first partially-reflective layer 208, and a second partially-reflective layer 210 in a layer order from the illuminator substrate 202 toward a protective output lens or cover (not shown in FIG. 4) of the vehicle lighting module 102 that faces outward from the exterior of the vehicle 100. The first partially-reflective layer 208 defines an input surface 208a facing toward the illuminator substrate 202, and a first internal surface 208b opposite therefrom. The second partially-reflective layer 210 defines a second internal surface 210a facing toward the first partially-reflective layer 208, and an output surface 210b opposite therefrom. Either or both of the first partially-reflective layer 208 and/or the second partially-reflective layer 210 may be formed, for example, from a Wavelock foil commercially available from Wavelock Advanced Technology Co., Ltd. with 20% transmission.

The lighting assembly 200 also includes a second mask 222 disposed on the input surface 208a of the first partially-reflective layer 208. The lighting assembly 200 also includes a bezel 214.

The first mask 206 defines a first obscuration pattern configured to obscure some of the light emitted from the plurality of LEDs $204_1 \ldots 204_n$ and to thereby produce unobscured light corresponding to the first obscuration pattern.

The first mask 206 may include, for example, a clear film having an opaque pattern printed thereon, or can be formed via masking (e.g., perforations in a selected pattern in a material that is opaque or has a selected transmission percentage). The obscuration pattern can include a random pattern such as a random swirl pattern or a pattern of random granularity as shown in FIG. 5A.

The second mask 222 defines a second obscuration pattern that further obscures the unobscured light that passed the first mask 206. The second mask 222 may include, for example, a clear film having an opaque pattern printed thereon. Alternatively or additionally, the second mask 222 can be formed via masking (e.g., perforations in a selected pattern in a material that is opaque or has a selected transmission percentage). The second obscuration pattern of the second mask 222 can be random, such as a random swirl pattern or a pattern of random granularity as shown in FIG. 5B. In some embodiments, the second mask 222 may be made from an opaque vinyl material disposed on the input surface 208a of the first partially-reflective layer 208.

As shown in FIGS. 5A and 5B, in accordance with an example embodiment, the second obscuration pattern of the second mask 222 is more dense than the first obscuration pattern of the first mask 206 (i.e., the second mask 222 may be configured to allow a smaller percentage of inputted light to pass than the percentage of inputted light passed by the first mask 206). In accordance with an example embodiment, the respective obscuration patterns of the first mask 206 and the second mask 222 are each random. Alternatively, only one of the respective obscuration patterns of the first mask 206 and the second mask 222 may be random. As shown in FIGS. 7A and 7B, other examples of first and second obscuration or mask patterns can include a swirl pattern for the first obscuration pattern of the first mask 206 and a random pattern for the second obscuration pattern of the second mask 222. The swirl pattern of FIG. 7A includes several alternating ridges or lines of masking spaced apart from one another at regular intervals with an appearance similar to a fingerprint. The random pattern of FIG. 7B may appear similar to static, with square pixels arranged in a regular pattern of columns and lines and which are randomly either masked (i.e. dark) or unmasked (i.e. light). However, either or both of the masks 206, 208 may have a different pattern.

With continued reference to FIGS. 3 and 4, the first partially-reflective layer 208 and the second partially-reflective layer 210 are parallel to and spaced apart from one another and together form a reflection chamber 208, 210 defining an interior chamber 212 between the first partially-reflective layer 208 and the second partially-reflective layer 210. The first partially-reflective layer 208 and the second partially-reflective layer 210 each also extend parallel to the illuminator substrate 202. Some light may pass through the second partially-reflective layer 210, exiting from the output surface 210b through the bezel 214 and out of the lighting assembly 200.

In some embodiments, the first partially-reflective layer 208 can be located at or about 18 millimeters (mm) from the illuminator substrate 202, and the second partially-reflective layer 210 can be located at or about 8 mm from the first partially-reflective layer 208. The interior chamber 212 may extend along a width of the lighting assembly 200 and may be commensurate in width with the illuminator substrate 202.

FIGS. 6A, 6B and 6C illustrate a different example form factor for a vehicle lighting module 102 than shown in FIG. 3. FIG. 6D illustrates example light ray behavior with respect to the optic component layers 206, 208, 210 constructed and arranged in accordance with example embodiments.

FIG. 6D shows a housing 216 defining the bezel 214 and containing a support frame 218 for holding various components 202, 206, 208, 210 of the lighting assembly 200. FIG. 6D also shows some details of the first partially-reflective layer 208 and the second partially-reflective layer 210. Either or both of the first partially-reflective layer 208 and/or the second partially-reflective layer 210 may be formed from a foil with 20% transmission configured to reflect a portion of incident light thereupon and to transmit at least about 20% of the incident light therethrough. However, either or both of the first partially-reflective layer 208 and/or the second partially-reflective layer 210 may provide a transmission that is greater than 20% or less than 20%.

The first partially-reflective layer 208 includes a first base layer 220 of light-transmissive material, such as Acrylonitrile Butadiene Styrene (ABS), with a first metalized layer 224 disposed thereupon. The second partially-reflective layer 210 includes a second base layer 226 of light-transmissive material, such as Acrylonitrile Butadiene Styrene (ABS), with a second metalized layer 228 disposed thereupon.

In some embodiments, and as illustrated by the three parallel light rays exiting from the lighting assembly 200 on FIG. 6D, an illumination pattern formed by the LEDs $204_1 \ldots 204_n$, in combination with one or more masks 206, 222, generates a multiple reflection effect presenting multiple instances of the illumination pattern that are offset in one or more spatial dimensions. In other words, the multiple reflection pattern may appear to be translated at regular intervals. The multiple instances of the illumination pattern may also appear as being progressively dimmer and/or further away from a viewer as a result of the corresponding multiple reflections between the first partially-reflective layer 208 and the second partially-reflective layer 210 across the interior chamber 212.

It is to be understood that different numbers of optic component layers 206, 208, 210 can be arranged in different order than those shown in FIGS. 3 and 4. Further, one or more obscuration patterns can be used and can be standalone layers or part of another layer such as a surface of the first partially-reflective layer 208 and/or the second partially-reflective layer 210. In other words, the obscuration patterns and the reflective layers can be combined, such that the obscuration pattern of the first mask 206 can instead be on the first partially-reflective layer 208, obviating the first mask 206, and the second obscuration pattern can be located on one of the surfaces 210a, 210b of the second partially-reflective layer 210. Such a layer arrangement could add another element of randomization to the pattern, particularly if on the output surface 210b. Although such a layer arrangement could potentially reduce the amount of perceived infinite depth effect by a viewer, the arrangement could still be acceptable given the amount of light available from the source (e.g., the LEDs $204_1 \ldots 204_n$).

The desired effect achieved by the lighting assembly 200 and method (e.g., FIG. 10) of the present disclosure will now be described in connection with the illustrated embodiment of FIGS. 3, 4, 5A and 5B. The first mask 206 with the first obscuration pattern (e.g., FIG. 5A) can have a desired pattern outputting multiple desired images. The second mask 222 with the second obscuration pattern (e.g., FIG. 5B) is in front of and spaced away from the first mask 206. The second mask 222 has a random pattern which randomly transmits light emitted from the first mask 206. As a viewer moves relative to the lighting assembly 200, the viewing angle changes and light rays from a particular point on the first mask 206 will pass through a different part of the second mask 222, resulting in random variation of the outputted light pattern and the appearance of twinkling (e.g., randomly turn on/off of the light from points on the first mask 206 even though the LEDs $204_1 \ldots 204_n$ are not driven to flash off and on).

In the illustrated embodiment of FIGS. 3, 4, 5A and 5B, the reflective surfaces (e.g., 208b and 210a forming the interior chamber 212) continuously reflect the input images within the interior chamber 212 or mirrored cavity. This multiplies the images from the first mask 206 and increases variation in the intensity and size of the pattern because the reflections tend to dim the pattern image and the image becomes smaller with each reflection. The variation in light from the reflections provides a sense of depth to the pattern (e.g., some sources appear dimmer and/or smaller and therefore further away). As the viewing angle changes, the reflected images are perceived by the viewer as following the viewer and thereby advantageously convey motion or light flow for a striking, sparkling or twinkling appearance with perceived infinite depth from the multiple reflections of inputted light from the pattern of the first mask 206. The combination of random light variation (e.g., perceived twinkling), together with depth variation (e.g., intensity and/or size or reflected images), provides a viewer with a sense of three dimensional motion as the viewer moves relative to a lighting assembly 200.

In accordance with another example, non-opaque desired patterns on the second mask 222 can provide a non-random image (e.g., a slide or gradation) that can be illuminated by the output of the first mask 206 such that viewable images can be provided at both the first mask 206 and the second mask 222, whereby images of the first mask 206 appear to move with respect to the second mask 222 as the viewer moves to create a parallax effect. In other words, the second mask 222 can have both a desired pattern and a random pattern to allow images from the first mask 206 and the second mask 222 to appear to originate from the second mask 222.

With reference to FIG. 9, the light function(s) and integrated desirable lighting effect provided by a lighting assembly 200 constructed in accordance with example embodiments of the present disclosure can be controlled using a control module indicated generally at 230 that comprises one or more LED driver(s) 232a, 232b for driving respective groups of the LEDs $204_1 \ldots 204_n$ for one or more light functions. Although two groups of LED dies are represented in FIG. 9 by a dashed line encircling an example group of LED dies controlled by the driver 232a and the remaining LED dies controlled by the driver 232b, it is to be understood that additional drivers 232n can be used for driving other groups of the LEDs $204_1 \ldots 204_n$ on the illuminator substrate 202 in the lighting assembly 200 for additional light functions, and that LED dies in respective one of the groups of LED dies can be interspersed with each other, and in different patterns than shown in FIG. 9. The drivers 232a, 232b are controlled by a controller 250 connected to a vehicle bus such as a Controller Area Network (CAN) bus or Local Interconnect Network (LIN) bus in the vehicle 100. The controller can be the vehicle 100 electronic control unit (ECU), or a part of the multi-function lighting assembly 200 or a part of the vehicle lighting module 102 and connected via a separate wiring harness to the ECU. The controller 250 controls the drivers 232a, b based on inputs from one or more sources in the vehicle such as control inputs 252 (e.g., turn indicators, or manual on/off switch for rear fog light feature), light sensor 254 (e.g., for automatic operation of headlights), camera 256, optional fog sensor 258 (e.g., for automatically turning on a fog light feature) and various vehicle control settings (e.g., engine powered on, brakes activated, and so on). The drivers 232a, 232b can be controlled independently and operate different groups of the LEDs $204_1 \ldots 204_n$ at different times and at different intensities depending on the light function being achieved.

In accordance with an example embodiment, a method 1000 of generating occultation imaging from a lighting assembly is illustrated in FIG. 10. As can be appreciated in light of the disclosure, the order of operation within the method is not limited to the sequential execution as illustrated in FIG. 10, but may be performed in one or more varying orders as applicable and in accordance with the present disclosure.

The method 1000 includes arranging an illuminator substrate extending across a width of the lighting assembly with a plurality of LEDs disposed thereupon and distributed thereacross, at step 1002.

The method 1000 also includes emitting light from the LEDs on the illuminator substrate at step 1004.

The method 1000 also includes obscuring the light emitted from the plurality of LEDs in accordance with at least one obscuration pattern and to produce an unobscured light at step 1006.

The method 1000 also includes generating plural reflections of the unobscured light at step 1008. The plural reflections may be generated across at least part of the width of the lighting assembly.

The method 1000 also includes outputting the plural reflections from the lighting assembly at step 1010.

The implementations, examples, and illustrations described herein may be combined. Also, the components and devices described herein may be implemented in a number of ways. For example, system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) can be used to implement the multi-function lighting assembly 200 and different vehicle lighting applications as described in the present disclosure. Although his disclosure describes techniques, components and products that are well-suited to lighting using unpackaged LEDs, example embodiments of the present disclosure can also be implemented using packaged LEDs.

Example embodiments described herein are implemented at the assembly level, that is, after LED dies are disposed on a "circuit substrate"). The term "circuit substrate" and/or alternatively, "substrate," can include, but is not limited to: a paper, glass, or polymer substrate formed as a sheet or other non-planar shape, where the polymer—translucent or otherwise—may be selected from any suitable polymers, including, but not limited to, a silicone, an acrylic, a polyester, a polycarbonate, etc.; a circuit board (such as a printed circuit board (PCB)); a string or thread circuit, which may include a pair of conductive wires or "threads" extending in parallel; and a cloth material of cotton, nylon, rayon, leather, etc. The choice of material of the illuminator substrate 202, as discussed herein, may include durable materials, flexible materials, rigid materials, and/or other materials which maintain suitability for the end use of the product. Further, a substrate, such as a circuit substrate, may be formed solely or at least partially of conductive material such that the substrate acts as a conductive circuit for providing electricity to one or more of the LEDs $204_1 \ldots 204_n$.

Illustrative embodiments of the present disclosure can use high-volume micro and mini-LEDs for vehicle 100 lighting applications. The lighting assembly 200 of the illustrated embodiments can therefore be much thinner than conventional vehicle light modules, and can be flexible for curved molding to the contour of a vehicle lift gate or other part of vehicle exterior body. The lighting assembly 200 can achieve superior aesthetics to conventional vehicle light modules and at a fraction of the energy needed by conventional vehicle light modules to achieve the desirable effects of a three-dimensional lighting effect with parallax, depth, and brightness variability or twinkling among different viewing angles, and thereby achieve high-performance, high-efficiency vehicle lighting with greater styling freedom (i.e., in terms of cost, aesthetics and versatility) than conventional vehicle lighting technologies.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the

What is claimed is:

1. A lighting assembly for generating occultation imaging, comprising:
an illuminator substrate with a plurality of light emitting diodes (LEDs) disposed thereupon and distributed across the illuminator substrate to emit light therefrom;
at least one mask defining an obscuration pattern and configured to obscure some of the light emitted from the plurality of LEDs and to produce unobscured light defining an illumination pattern corresponding to the obscuration pattern; and
a reflection chamber having an input surface that receives the unobscured light, two partially-reflective layers facing toward one another to define an interior chamber and configured to generate multiple reflections of the unobscured light presenting multiple instances of the illumination pattern that are offset in one or more spatial dimensions, and an output surface that directs light from the multiple reflections to outside the reflection chamber,
wherein the at least one mask is located outside of the interior chamber of the reflection chamber.

2. The lighting assembly of claim 1, wherein the plurality of LEDs include unpackaged LED dies.

3. The lighting assembly of claim 2, wherein the unpackaged LED dies are each configured as mini LED dies having an area of between 100 µm and 350 µm.

4. The lighting assembly of Claim 2, wherein the unpackaged LED dies are each configured as micro LED dies having an area of between 2 µm and 100 µm.

5. The lighting assembly of Claim 1, wherein the two partially-reflective layers of the interior chamber extend parallel to one another.

6. The lighting assembly of claim 1, wherein the two partially-reflective layers of the interior chamber each extend parallel to the illuminator substrate.

7. The lighting assembly of claim 1, wherein the at least one reflective layer of the reflection chamber includes a metallic layer disposed on a reflector substrate.

8. The lighting assembly of claim 1, wherein the at least one reflective layer of the reflection chamber is configured to reflect a portion of incident light thereupon and to transmit at least about 20% of the incident light therethrough.

9. The lighting assembly of claim 1, wherein the obscuration pattern includes a random pattern.

10. The lighting assembly of claim 1, wherein the at least one mask includes two masks spaced apart from one another, with each of the two masks being located outside of the interior chamber of the reflection chamber.

11. The lighting assembly of claim 1, wherein the at least one mask includes a mask layer disposed on the input surface of the reflection chamber.

12. The lighting assembly of claim 1, wherein the at least one mask includes a mask layer disposed between and spaced apart from each of the illuminator substrate and the input surface of the reflection chamber.

13. The lighting assembly of claim 1, wherein the reflection chamber comprises two partially-reflective layers; and
wherein the illuminator substrate is curved and the two partially-reflective layers are each curved with a curvature corresponding to the curvature of the illuminator substrate.

14. A method of generating occultation imaging from a lighting assembly, comprising:
arranging an illuminator substrate extending across a width of the lighting assembly with a plurality of light emitting diodes (LEDs) disposed thereupon and distributed thereacross;
emitting light from the plurality of LEDs on the illuminator substrate;
obscuring, by at least one mask, the light emitted from the plurality of LEDs in accordance with at least one obscuration pattern and to produce an unobscured light defining an illumination pattern;
generating, by a reflection chamber having two partially-reflective layers facing toward one another to define an interior chamber, plural reflections of the unobscured light presenting multiple instances of the illumination pattern that are offset in one or more spatial dimensions, the plural reflections being generated across at least part of the width of the lighting assembly; and
outputting the plural reflections from the lighting assembly,
wherein the at least one mask is located outside of the interior chamber of the reflection chamber.

15. The method of claim 14, wherein the reflection chamber includes an input surface; and
wherein the at least one mask includes a first mask layer between and spaced apart from each of the illuminator substrate and the input surface of the reflection chamber.

16. The method of claim 15, wherein the at least one mask further includes a second mask layer between the first mask layer and the input surface of the reflection chamber.

17. The method of claim 16, further comprising generating a twinkling effect using a random pattern for at least one of the first mask layer and the second mask layer.

18. The method of claim 14, wherein the two partially-reflective layers are spaced apart from one another.

19. The method of claim 18, wherein the two partially-reflective layers of the reflection chamber extend parallel to one another and parallel to the illuminator substrate.

* * * * *